United States Patent
Hasegawa et al.

(10) Patent No.: US 10,388,304 B1
(45) Date of Patent: Aug. 20, 2019

(54) STORING DATA ON UNUSED AREAS OF A STORAGE MEDIUM

(71) Applicant: International Business Machines Corporation, Armonk, NY (US)

(72) Inventors: Tohru Hasegawa, Tokyo (JP); Atsushi Abe, Ebina (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/140,606

(22) Filed: Sep. 25, 2018

Related U.S. Application Data

(63) Continuation of application No. 15/914,695, filed on Mar. 7, 2018, now Pat. No. 10,134,427.

(51) Int. Cl.
  *G11B 5/02* (2006.01)
  *G11B 5/008* (2006.01)
  *G11B 20/12* (2006.01)

(52) U.S. Cl.
  CPC ...... *G11B 5/00813* (2013.01); *G11B 20/1201* (2013.01); *G11B 2020/1291* (2013.01); *G11B 2220/90* (2013.01)

(58) Field of Classification Search
  CPC ............ G11B 5/00813; G11B 20/1201; G11B 2020/1291; G11B 2220/90; G11B 5/012; G11B 27/36; G11B 5/02; G11B 2220/20; G11B 27/3027; G11B 15/52; G11B 15/1875; G11B 5/5508
  USPC ... 360/25, 31, 45, 48, 55, 72.1, 73.04, 77.12
  See application file for complete search history.

(56) References Cited

U.S. PATENT DOCUMENTS

| | | |
|---|---|---|
| 8,576,505 B2 | 11/2013 | Evans et al. |
| 9,348,837 B2 | 5/2016 | Iwanaga et al. |
| 9,454,988 B2 | 9/2016 | Nohta et al. |

OTHER PUBLICATIONS

Iwanaga et al., "Storing Data on Unused Areas of a Storage Medium", U.S. Appl.No. 15/914,695, filed Mar. 7, 2018, 36 pages.
IBM, "List of Patent Applications Treated As Related", Appendix P, Filed Herewith, 2 pp.

*Primary Examiner* — Nabil Z Hindi
(74) *Attorney, Agent, or Firm* — Edward J. Wixted, III.

(57) ABSTRACT

Mounting a data storage medium having information recorded thereon, where: the information is formatted according to a data storage format standard that includes first write and read functions, the information includes first and second datasets, the first dataset includes a first file mark, an index, and an empty space between the second dataset and a combination of the first file mark and the index; receiving, from a first application, a data block and a write command for writing the data block onto the data storage medium; and in response to receiving the write command: determining that the empty space is present in the first dataset, writing, by a second write function, the data block into the empty space, and writing a second file mark in the second dataset; wherein the empty space of the data storage medium is inaccessible to the first write function of the data storage format standard.

18 Claims, 7 Drawing Sheets

US 10,388,304 B1

STORING DATA ON UNUSED AREAS OF A STORAGE MEDIUM

BACKGROUND

The present invention relates generally to the field of computer data storage, and more particularly to a linear tape file system for data storage on tape.

A linear tape file system (LTFS) provides a file system interface to data that is stored on a magnetic tape medium. The data can be written and read in a manner similar, for instance, to the way data is stored on disks, and removable flash drives. The LTFS specifies a data format and requires corresponding software to provide the file system interface. LTFS is an open specification and is based on a self-describing tape format. The LTFS format prescribes that a tape is divided into two partitions, an index partition and a data partition. Meta-information such as file allocation information is recorded in the index partition. An index and a data body are recorded in the data partition. The LTFS format specification further prescribes that an index is interposed between special markers called file marks.

SUMMARY

According to an aspect of the present invention, there is a method, computer program product and/or system that performs the following operations (not necessarily in the following order): (i) receiving, from a first application, a data block and a corresponding write command for writing the data block onto the data storage medium having information recorded thereon; and (ii) in response to receiving the write command: determining that the empty space is present in the first dataset, writing, by a second write function, the data block into the empty space, and writing a second file mark in the second dataset. The information is formatted in accordance with a data storage format standard that includes a first write function and a first read function. The information includes a first dataset and a second dataset. The first dataset includes a first file mark, an index, and an empty space interposed between the second dataset and a combination of the first file mark and the index. The empty space of the data storage medium is inaccessible to the first write function of the data storage format standard.

DETAILED DESCRIPTION

Figure 1A:
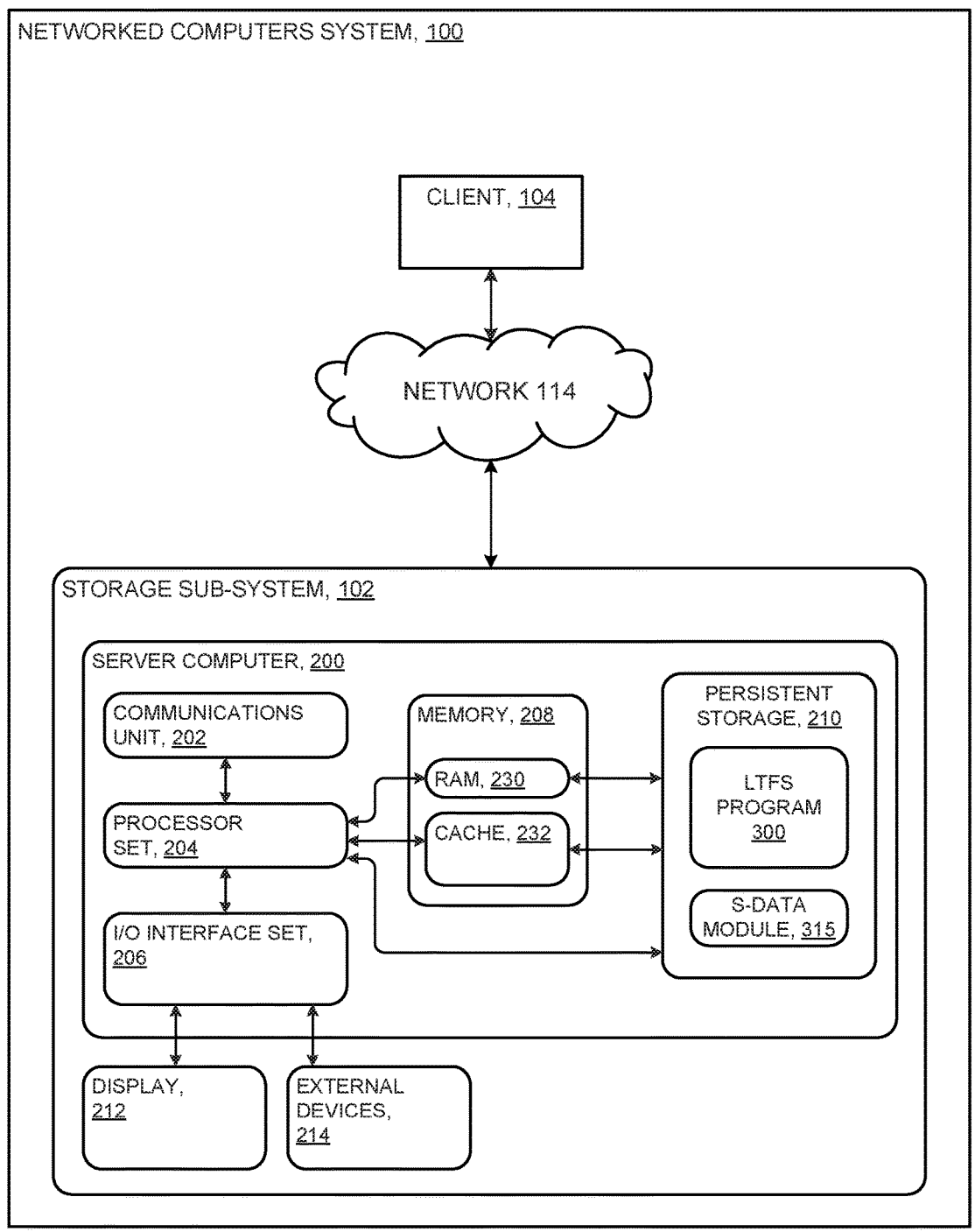
FIG. 1A is a functional block diagram showing a computing environment in accordance with at least one embodiment of the present invention.

Some embodiments of the present invention increase the data storage capacity of a tape by extending functions of a linear tape file system (LTFS). A special write function (S-Write) and a special read function (S-Read) are introduced. The S-Write function is able to write certain data (such as LTFS logging information) in areas of a tape that otherwise are unused by storage systems operating in accordance with an LTFS specification (for example in an empty space between an index and a file mark). Data written by the S-Write function is referred to as special data (S-Data). The S-Read function is able to read S-Data that has been written by the S-Write function.

This Detailed Description section is divided into the following sub-sections: (i) The Hardware and Software Environment; (ii) Example Embodiment; (iii) Further Comments and/or Embodiments; and (iv) Definitions.

I. The Hardware and Software Environment

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

An embodiment of a possible hardware and software environment for software and/or methods according to the present invention will now be described in detail with reference to the Figures. FIG. 1A is a functional block diagram illustrating various portions of networked computers system 100, including: storage sub-system 102; client computer 104; communication network 114; storage system 120; server computer 200; communications unit 202; processor set 204; input/output (I/O) interface set 206; memory device 208; persistent storage device 210; display device 212; external device set 214; random access memory (RAM) devices 230; and cache memory device 232.

Storage sub-system 102 is, in many respects, representative of the various computer sub-system(s) in the present invention. Accordingly, several portions of storage sub-system 102 will now be discussed in the following paragraphs.

Storage sub-system 102 may be a laptop computer, tablet computer, netbook computer, personal computer (PC), a desktop computer, a personal digital assistant (PDA), a smart phone, or any programmable electronic device capable of communicating with the client sub-systems via network 114. LTFS program 300 is a collection of machine readable instructions and/or data that is used to create, manage and control certain software functions that will be discussed in detail, below, in the Example Embodiment sub-section of this Detailed Description section.

Storage sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Storage sub-system 102 is shown as a block diagram with many double arrows. These double arrows (no separate reference numerals) represent a communications fabric, which provides communications between various components of storage sub-system 102. This communications fabric can be implemented with any architecture designed for passing data and/or control information between processors (such as microprocessors, communications and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that, now and/or in the near future: (i) external device(s) 214 may be able to supply, some or all, memory for storage sub-system 102; and/or (ii) devices external to storage sub-system 102 may be able to provide memory for storage sub-system 102.

LTFS program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data), on a tangible medium (such as magnetic or optical domains); and (iii) is substantially less persistent than permanent storage. Alternatively, data storage may be more persistent and/or permanent than the type of storage provided by persistent storage 210.

LTFS program 300 may include both machine readable and performable instructions and/or substantive data (that is, the type of data stored in a database). In this particular embodiment, persistent storage 210 includes a magnetic hard disk drive. To name some possible variations, persistent storage 210 may include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to storage sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, LTFS program 300, can be stored on such portable computer-readable storage media. In these embodiments the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor or a smart phone display screen.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 1B:
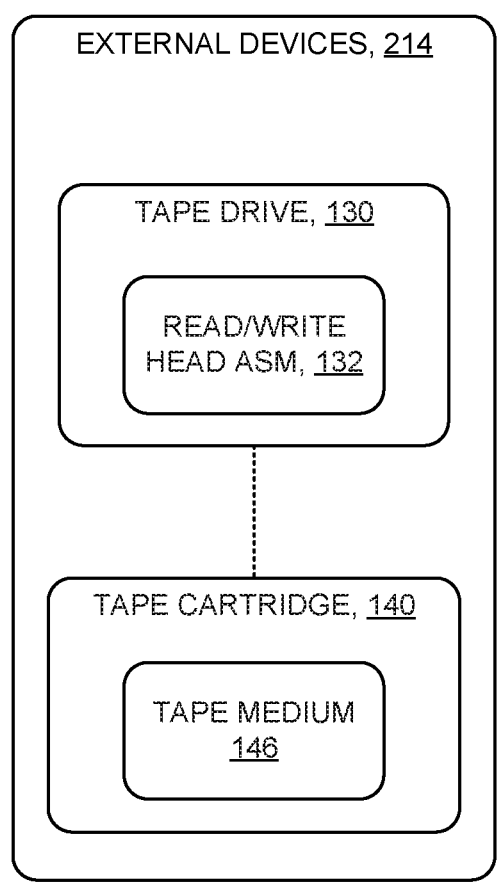
FIG. 1B is a functional block diagram showing at least some components of external devices, in accordance with at least one embodiment of the present invention.

FIG. 1B is a block diagram depicting some components of external devices 214, in accordance with some embodiments of the present invention. In particular, external devices 214 includes: tape drive 130 (a data storage device); read/write head assembly 132; tape cartridge 140; and tape medium 146 (a data storage medium).

II. Example Embodiment

Figure 2:
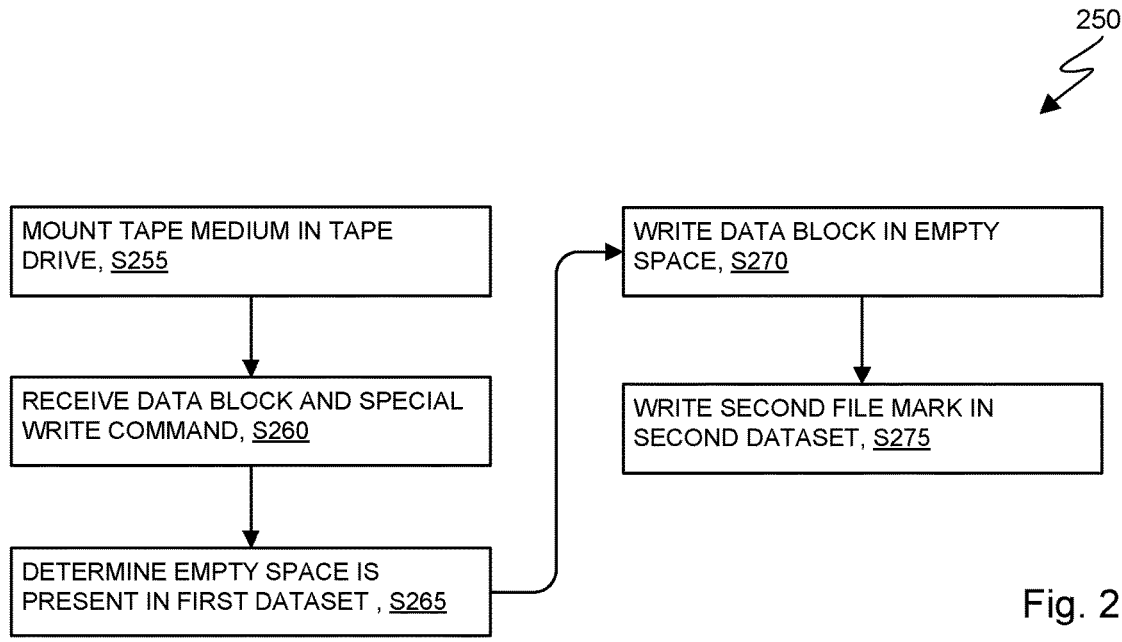
FIG. 2 is a flowchart showing a method performed, at least in part, in accordance with at least one embodiment of the present invention.
Figure 3:
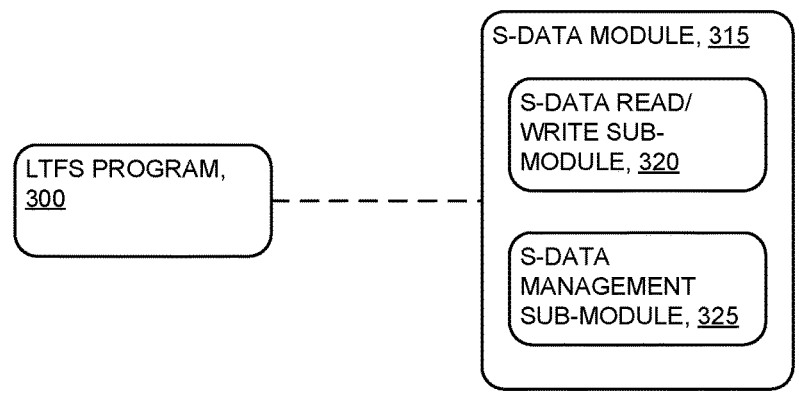
FIG. 3 is a block diagram showing a machine logic (for example, software) portion of a system in accordance with at least one embodiment of the present invention.

FIG. 2 shows flowchart 250 depicting a method according to the present invention. FIG. 3 shows LTFS program 300 for performing at least some of the method operations of flowchart 250. This method and associated software will now be discussed, over the course of the following paragraphs, with extensive reference to FIG. 2 (for the method operation blocks) and FIG. 3 (for the software blocks). For purposes of this discussion: (i) a data block refers to user data that is written and/or read by a conventional LTFS; and (ii) a dataset refers to a fix-length area of a tape track, a plurality of which lie in a sequential series formatted along the length of the tape track in a conventional LTFS.

Processing begins at operation S255, where tape drive 130 of external devices 214 (FIG. 1B), of storage sub-system 102 (FIG. 1A), mounts a tape medium in preparation for reading and/or writing information from and/or to the tape medium. This is commonly referred to as mounting a tape cartridge into a tape drive unit, where the tape drive accepts the tape cartridge, threads the tape through the drive mechanism and onto a take-up spool, and transports the tape to bring a particular location under the read/write head in preparation performing a read and/or write operation. In this example embodiment, the starting location is the first dataset (see operation S265 below).

Processing proceeds to operation S260 where S-Data module 315 receives a data block and a write command. S-Data module 315 works in conjunction with LTFS program 300. In some embodiments, the S-Data module is an extension of LTFS program 300. In this embodiment, the first data block comprises special data (S-Data) and the write command is a special write command (S-Write). Discussion of S-Data, and S-Write and S-Read commands, is found below in Section III—Further Comments and/or Embodiments. Briefly, in this example embodiment, the S-Write command permits writing of S-Data, in the context of an LTFS system, in an empty area of the tape that is otherwise inaccessible to a conventional LTFS system, thereby increasing the data capacity of the tape. An S-Read command permits reading of the S-Data, which again, is inaccessible to a conventional LTFS system.

Processing proceeds at operation S265, where S-Data management sub-module 325 of S-Data module 315, determines that an empty space is present in the first dataset of the tape. The first dataset presently contains user data, a first file mark, and an index, all three having been written either previous to the present mounting of the tape cartridge (see operation S255 above), or at any time subsequent to the mounting. In some embodiments of the present invention, data written into this empty space is referred to as S-Data. The empty space may resides between the index and the end of the first dataset (which is coincident with the start of a second dataset). The empty space is inaccessible to, and consequently not usable in, a conventional LTFS system. The empty space detracts from the total data capacity of the tape.

Processing proceeds at operation S270, where S-Data read/write sub-module 320 of S-Data module 315 writes the data block, received in operation S260 above, into the empty space of the first dataset.

Processing proceeds at operation S275, where S-Data read/write sub-module 320 of S-Data module 315 of LTFS program 300 writes a second file mark, at the beginning of the second dataset.

III. Further Comments and/or Embodiments

When writing a data file, sent from an application, onto a tape medium in a manner that is compliant with an LTFS specification in some embodiments, the software divides the data file, which may be of arbitrary length, into a plurality of fixed length blocks of data, although at least one block (for example, the last block) may be smaller than the fixed length. Each data block is stored within a fixed length area of the tape called a dataset. The tape has one or more sequential series of datasets. A dataset may have a length, for example, of a few megabytes. The tape drive records the data blocks in as many datasets as are needed to store the plurality of data blocks that together make up the data file.

For example, consider two data files that are to be stored on a tape. In this illustration, the data files are referred to as records: record 1, and record 2. Record 1 is larger than a dataset on the tape. Record 1 is divided into two data blocks, data block 1-1 and data block 1-2. Data block 1-1 is stored in dataset 1. Data block 1-2 is stored in dataset 2. Now, dataset 2 has room for more data, but record two is too large to fit in the remaining space of dataset 2. So record 2 is divided into two data blocks, data block 2-1 and data block 2-2. Data block 2-1 is stored in the remaining available space of dataset 2. Data block 2-2 is stored in dataset 3. Thus, in this example: dataset 1 contains data block 1-1; dataset 2 contains data block 1-2 and data block 2-1; and dataset 3 contains data block 2-2. Stated another way, record 1 is distributed between datasets 1 and 2, and record 2 is distributed between datasets 2 and 3.

According to the LTFS format, a condition may exist in a dataset where the dataset has an area in which no data is written, for example, an empty area between an index and a file mark. This empty area is not accessible for reading or writing by a conventional LTFS system. Some embodiments of the present invention extend the firmware of a tape drive. A special read command (called S-Read) and a special write command (called S-Write) are introduced. S-Read and S-Write commands go beyond the conventional read/write commands, such as SCSI (small computer system interface) read/write commands.

When a tape drive firmware receives an S-Write command and corresponding data, the tape drive firmware writes as much of the data as possible into the same dataset (DS) into which the tape drive firmware has just (most recently) written a record. When the tape drive firmware receives an S-Read command, the tape drive firmware reads data which has been written by an S-Write command in the dataset (DS) at which the tape drive's read/write head is currently located.

In conventional read/write functionality, a tape drive (in particular, the tape drive firmware) receives a write command and a corresponding data record sent from an application for storing within one or more datasets on the tape medium. In some embodiments of the present invention, all datasets on the tape medium are of the same, fixed length. The data record accompanying each write command may be of arbitrary length. There is no relationship between the length of any particular record and the fixed length of a dataset associated with the target tape. The firmware divides the record into fixed-length data blocks such that each block will fit within available space in a dataset, and writes the data blocks onto one or more datasets of the tape.

In addition to each data block, the firmware adds meta-information including information that identifies at which location(s) the record (of at least one of the data blocks that make up the record) has been stored. Embodiments of the present invention extend this meta-information to further include meta-information that identifies the location(s) of data written by an S-Write command (called S-Data), in addition to the meta-information for a normal record. In some embodiments, writing S-Data physically onto a tape involves adding parity information or other error correcting code, in a manner similar to writing of error correction code associated with a conventional record. In some embodiments, S-Data is unlike conventional records in that S-Data is inaccessible via conventional read/write commands such as are available within a conventional LTFS system.

Figure 4:
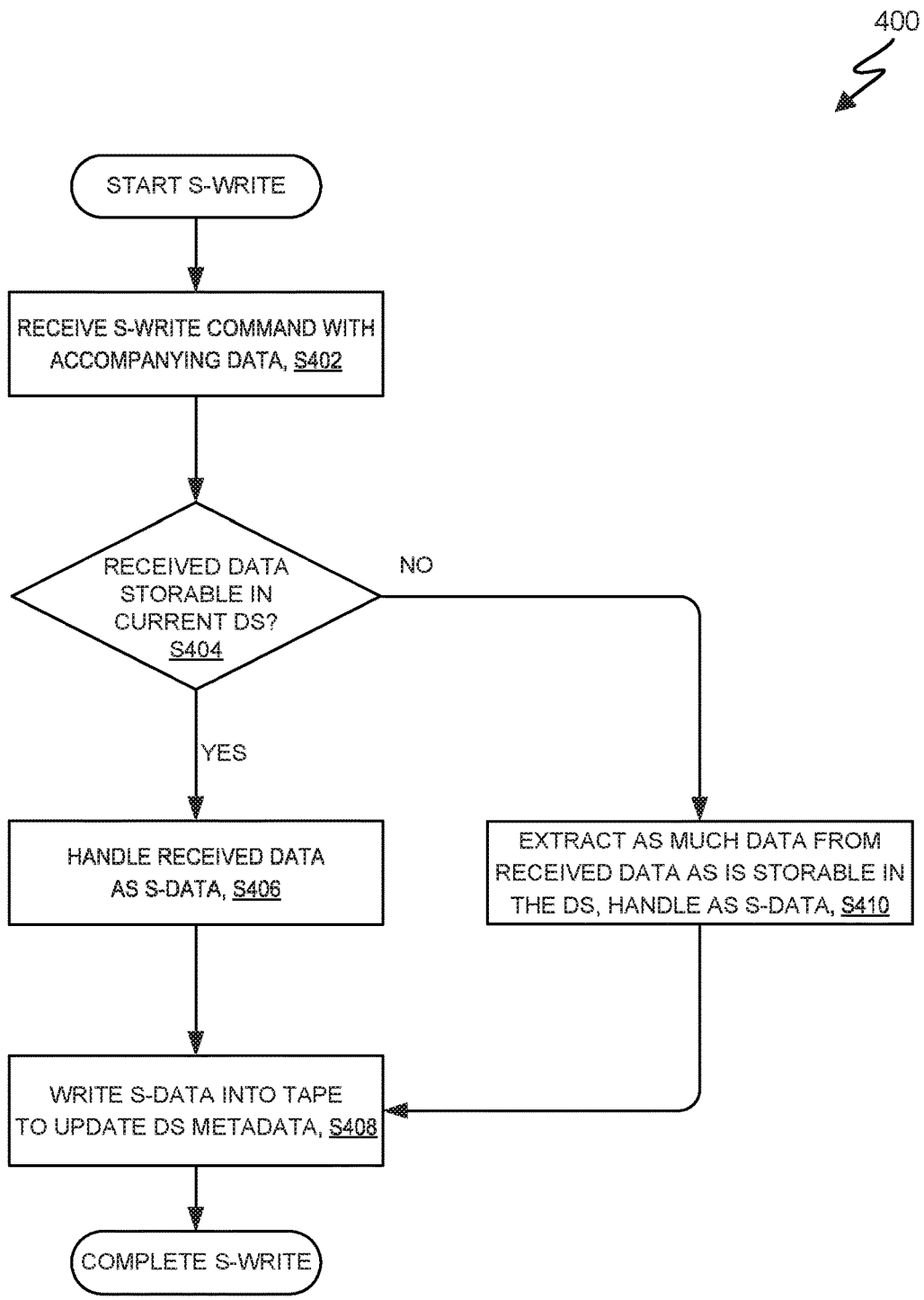
FIG. 4 is a flowchart showing an S-Write method performed, at least in part, in accordance with at least one embodiment of the present invention.

S-Write flowchart 400 of FIG. 4 shows a process whereby some embodiments perform an S-Write operation. Processing begins at operation S402 where the tape drive firmware receives an S-Write command with accompanying data.

Processing proceeds at decision S404. If the accompanying data (received data) is storable in the current dataset (decision S404, "Yes" branch), processing proceeds to operation S406 where the firmware treats the received data as special data (S-Data). The received data is storable in the current dataset if the empty space available in the S-Data portion of the current dataset is large enough to store the data. The S-Data portion of the current dataset is space between the index in the current dataset and the beginning of the next adjacent dataset (in the direction of movement of the read/write head relative to the tape during a read or write operation) (see S-Data 710 of FIG. 7).

Processing proceeds at operation S408 where the firmware writes the received data (now considered S-Data) to the tape in the empty S-Data space of the current dataset.

If the received data is not storable in the current dataset (decision S404, "No" branch), processing proceeds to operation S410 where the firmware extracts, from the received data, as much data as can be stored in the S-Data space of the current dataset. The firmware treats the extracted data as special data (S-Data). For example, consider a 5 MB data file that is received in conjunction with an S-Write command (for this example, the data file will be called a "special data file" and the data therein will be called "special data"). The current dataset has previously been populated (by conventional LTFS functionality) with at least user data, a file mark and an index. The firmware determines that, available to the S-Write command, there exists 4 MB of empty space in the current dataset, between the index and the beginning of the next adjacent dataset. This empty space is not available to conventional LTFS systems. The firmware extracts the first 4 MB of special data from the special data file and writes the extracted special data (via the S-Write function) onto the empty space, thereby utilizing 4 MB of otherwise unusable tape storage capacity (effectively increasing the tape storage capacity by 4 MB). In some embodiments, the firmware discards the remaining 1 MB of special data. In other embodiments, the firmware stores (via conventional LTFS write functionality) the remaining 1 MB of special data in the next available dataset as user data. In still other embodiments, the firmware stores (via S-Write functionality) the remaining 1 MB of special data in the next empty space that becomes available in another dataset (between an index in a dataset and the beginning of the next dataset, analogous to the empty space in the current dataset).

Processing proceeds at operation S408 wherein the firmware writes the extracted data (now considered S-Data) to the tape in the empty S-Data space of the current dataset.

Figure 5:
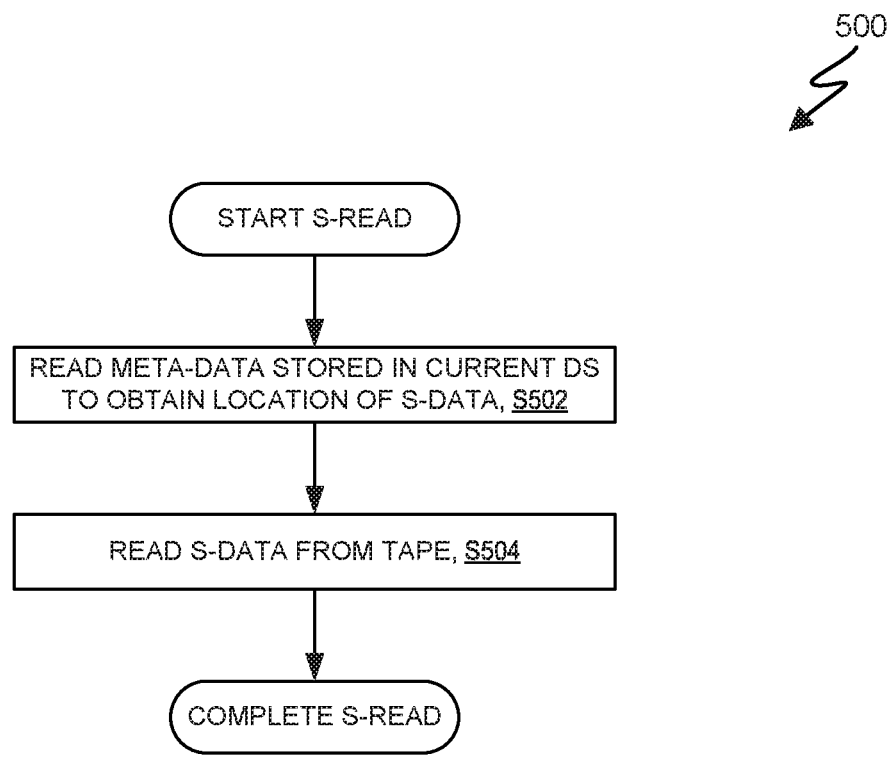
FIG. 5 is a flowchart showing an S-Read method performed, at least in part, in accordance with at least one embodiment of the present invention.

S-Read flowchart 500, of FIG. 5, shows a process whereby some embodiments perform an S-Read operation. Processing begins at operation S502, where the tape drive firmware receives an S-Read command. In some embodiments, an S-Read operation reads out S-Data in the current dataset (DS) (the dataset currently positioned at the read-write head). Alternatively, in some embodiments, the S-Read command specifies a particular dataset, and the firmware responds by positioning the specified dataset at the read-write head of the tape drive. In either case (current dataset or a specified dataset), processing of the command takes place once the correct dataset is positioned at the read-write head. The firmware then reads meta-data that is stored in the current dataset, to obtain the location of the S-Data.

Processing proceeds at operation S504 where, once having received the location of the S-Data, the firmware proceeds to read out the S-Data.

Figure 6:
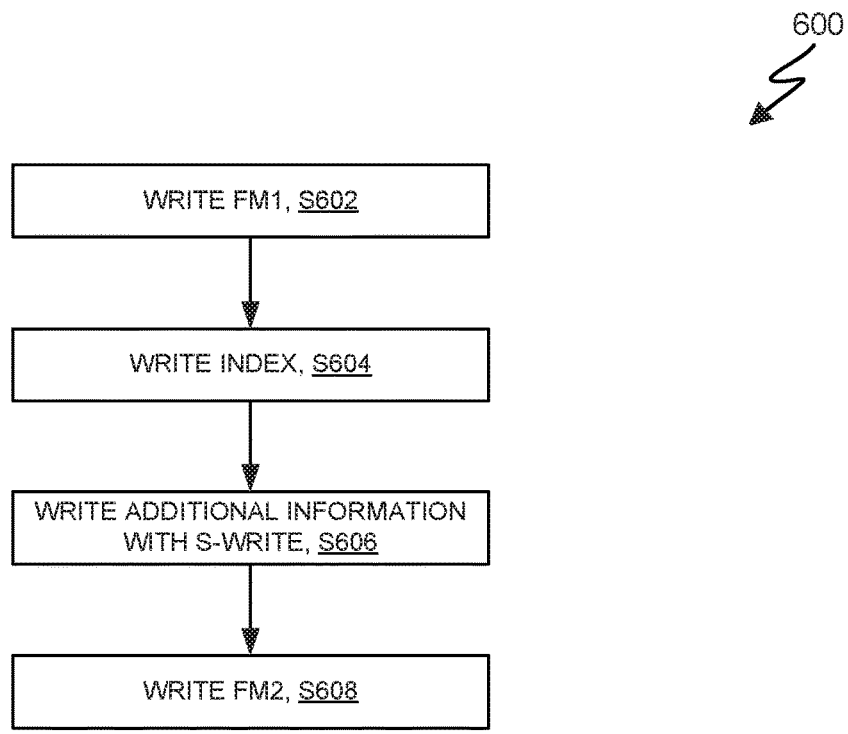
FIG. 6 is a flowchart showing an index-writing method performed, at least in part, in accordance with at least one embodiment of the present invention.
Figure 7:
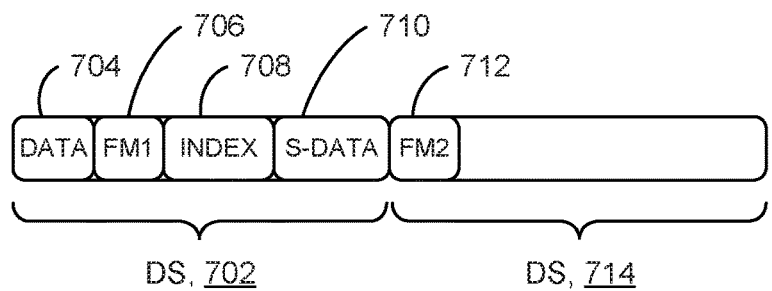
FIG. 7 is a block diagram showing a data format written to tape, in accordance with at least one embodiment of the present invention.

FIG. 6 shows file mark flowchart 600 depicting a method according to the present invention. FIG. 7 shows S-Data allocation diagram 700 depicting, in schematic form, data elements, including an S-Data element (710) in a data format written on a linear tape track in accordance with at least one embodiment of the present invention. In some embodiments of the present invention, datasets written onto the tape medium, have a fixed size (a fixed data capacity). As an example, the total capacity of dataset 702 includes the following data elements: data 704, the area within dataset 702 that is available for user data (also sometimes herein referred to as a data block) in accordance with a conventional LTFS format; file marker FM1 706; index 708; and S-Data 710.

The amount of space available for S-Data 710 varies, and is a function of the amount of space taken up by data 704, FM1 706, and index 708 in relation to the total capacity of dataset 702. For example, consider an embodiment where: (i) dataset 702 has a capacity (size) of 10 Mb; and (ii) data 704, FM1 706, and index 708, (and any additional data that may be present in some embodiments) combined, take up 8 Mb. In this case, there is 2 Mb of space available for S-Data 710 (10 Mb−8 Mb=2 Mb).

This method and associated data format will now be discussed, over the course of the following paragraphs, with extensive reference to FIG. 6 (for the method operation blocks) and FIG. 7 (for the data format elements). In some embodiments of the present invention, a modified linear tape file system (sometimes herein referred to as an extended LTFS or a modified LTFS) writes S-Data as part of an operation to write index 708. For purposes of this discussion: (i) a data block refers to user data, for example data 704 (this is data that is written and read by a conventional LTFS; and (ii) a dataset refers to a fix-length area of a tape track (dataset 702 of FIG. 7, is an example of one dataset in a series of datasets sequentially formatted along the length of a tape track in a conventional LTFS.

Processing begins at operation S602, where the extended LTFS (not shown in the Figures), after having written data 704 in accordance with conventional LTFS write methods, writes a first file mark, FM1 706. The size of the data to be written with an S-Write command is limited, in part, by the size of dataset 702, which in some embodiments may be a few megabytes in size.

In a write operation, the extended LTFS may determine the type of the tape drive, and change the size of data to be written by an S-Write command, based on the type of the tape drive. Alternatively, the extended LTFS may set the size of the data to a fixed length of any size (for example, ten megabytes, although this is not a limitation). Writing as described above results in S-Data 710 having been written onto a tape as shown schematically in FIG. 7.

Some embodiments of the present invention modify (extend) the LTFS to provide an S-Data read function. The extended LTFS writes a generation number of an index, which can be used as an ID, to identify the index on the tape, and associate the index with a special extended attribute (for example, ltfs.DumpSData) of the root directory. The extended attribute causes the extended LTFS to read S-Data from the tape and to store the S-Data as a file in a predetermined directory (for example, the installation directory of the extended LTFS).

S-Data cannot be read out as a normal record. Therefore, tape written by an LTFS in accordance with some embodiments of the present invention conforms to a conventional LTFS format and is usable also by conventional LTFS systems.

Writing S-Data onto a tape and reading the S-Data using an extended attribute, in a method in accordance embodiments of the present invention, enable effective utilization of the area (710) between an index (708) and a file marker (FM2 712, see FIG. 7) in a manner that complies with the conventional LTFS format. In other words, embodiments of the present invention extend the conventional LTFS format and function to expand the data capacity of an LTFS-compliant tape.

Processing proceeds at operation S604 where the extended LTFS (not shown in the Figures), writes index 708 in a current dataset.

Processing proceeds at operation S606 where an S-Write function writes "additional data" in the S-Data region of the current dataset (S-Data 710). A discussion, illustrating an example use of "additional data", is given a few paragraphs below.

Processing proceeds at operation S608 where the S-Write function writes a second file mark. In some embodiments of the present invention, the S-Write function places the second file mark (FM2 712) in the next dataset following the current dataset. Alternatively, in other embodiments, FM2 712 may be written in the current dataset.

Figure 8:
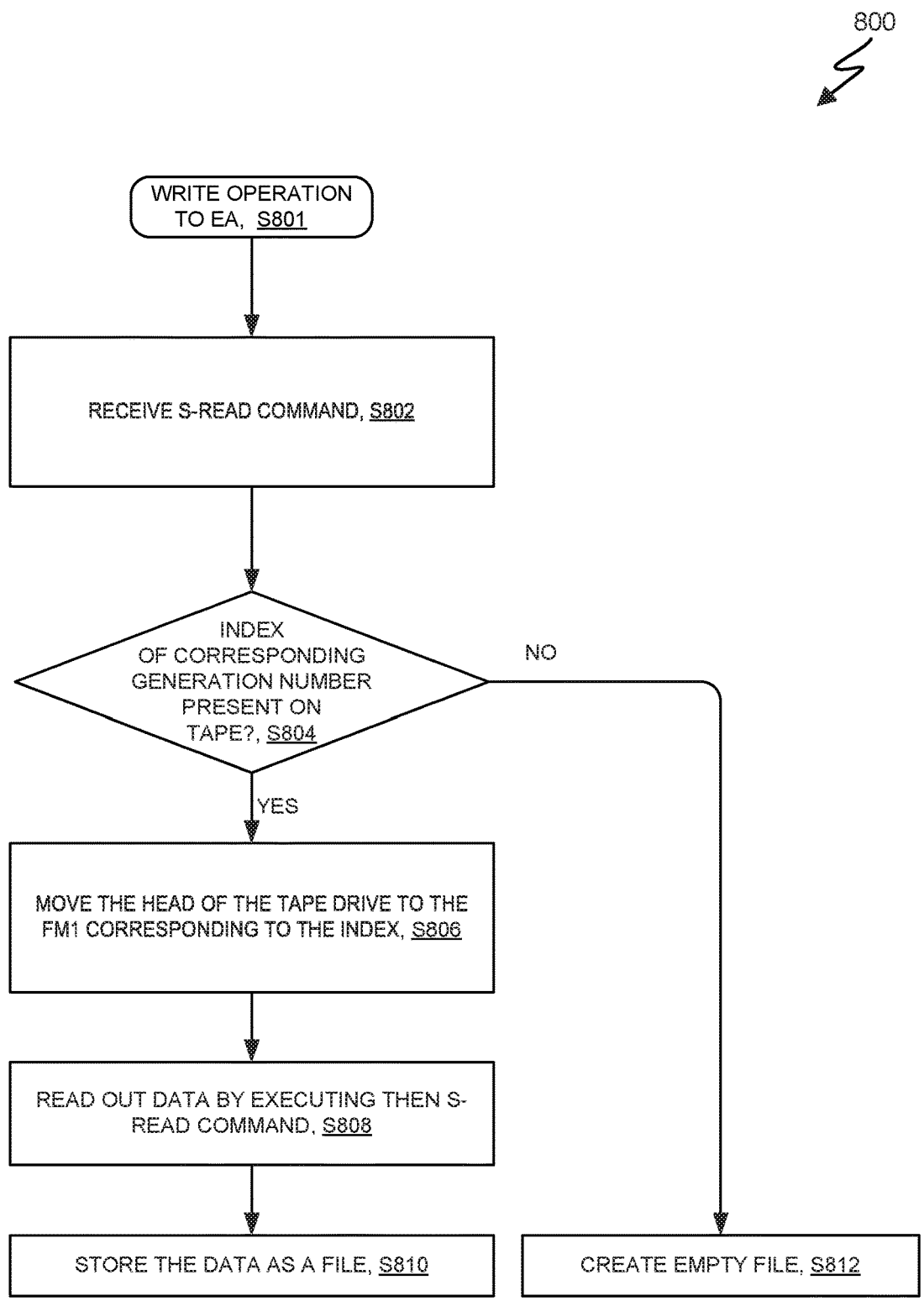
FIG. 8 is a flowchart showing an S-Read method performed, at least in part, in accordance with at least one embodiment of the present invention.

S-Read flowchart 800 of FIG. 8, depicts a method for reading S-Data in accordance with at least one embodiment of the present invention. A command to perform an S-Read operation includes a generation number. The S-Read operation searches for the index associated with the generation number, using the same method as that of a conventional LTFS rollback function.

Processing begins at operation S802 where S-Data read/write sub-module 320, of S-Data module 315 (see FIG. 3) receives a S-Read command from an application. The S-Read command includes a generation number, and specifies a location at which the S-Data, once read from the tape, is to be written. (Note, the LTFS has previously written (see phantom operation S801) a generation number of an index and associated the index with an extended attribute of a root directory.)

Processing proceeds at decision S804, where LTFS program 300 (see FIG. 3) determines if an index corresponding to the generation number included in the S-Read command received in operation S802 above, is present on the tape. If the index is present (decision S804, "Yes" branch), processing proceeds at operation S806, where tape drive 130 advances and/or retracts the tape to position the index under read/write head assembly 132 (of tape drive 130, of external devices 214, See FIG. 1B).

Processing proceeds at operation S808 where S-Data read/write sub-module 320 (FIG. 3), executes the S-Read command, received in operation S802 above, to read out the S-Data from the tape in the S-Data region of the dataset associated with the index corresponding to the generation number included in the S-Read command.

Processing proceeds at operation S810 where S-Data read/write sub-module 320 (FIG. 3), stores the S-Data, read out in operation S808 above, as a file in the location specified in the S-Read command received in operation S802 above.

Returning to decision S804, if LTFS program 300 (See FIG. 3) determines that an index corresponding to the generation number included in the S-Read command received in operation S802 above, is not present on the tape, processing proceeds at operation S812, where the S-Read command creates an empty file at the location specified in the S-Read command.

An example scenario performed in accordance with some embodiments of the present invention will now be discussed. An application records logs of preceding operations, as additional information, before writing an index.

By way of illustration, consider a problem that sometimes occurs in operation of a conventional LTFS system, where a user deletes a file from a tape and then unmounts the tape from the tape drive. Now assume that the user, later on, wants to recover the deleted file. When the tape is mounted in the drive again, the deleted file is not found, and cannot be recovered because the index had recorded the state of the tape at the time of the previous un-mounting. That is to say, the index does not include information as to the location of the "deleted" file. The state of the tape at the time an index is written is visible in an LTFS system. However, and in general, logs of file deletion operations may not be recorded. Therefore, it may be impossible for a user to recover the "deleted" file.

In contrast, some embodiments of the present invention enable the extended LTFS to record file deletion information by using S-Write operations to write file system access logs, in otherwise unused space on the tape in conjunction with writing an index (for example, S-Data 710 and index 708 of FIG. 7). By placing the access logs in the S-Data space, and not in user data space (data 704, see FIG. 7), the capacity of the tape for user data is not diminished or impacted by the S-Data. When the tape is subsequently re-mounted, a user can then retrieve the logs of accesses preceding the writing of the index, by specifying one or more previous indices in an extended attribute (for example ltfs.DumpSData as mentioned in the discussion above with respect to FIGS. 6 and 7). The user can then determine, by reference to the extended attribute, the location on the tape where the "deleted" file is located, and is then able to recover the "deleted" file.

In some embodiments of the present invention, S-Data is not limited to log files. Any data may be treated as S-Data, to make use of otherwise unusable space in one or more datasets on a tape. For example, consider a large file that spans a series of datasets on the tape. The file is divided into a series of data blocks, each block, except for the last one, taking up the full capacity of a corresponding dataset. If the last data block can fit into the S-Data region of the a partially filled dataset, an S-Write command can be called to store the last data block in the S-Data region. In this way, the last data block does not consume any space on the tape, as seen by a conventional LTFS system. There are many other scenarios, where any type of data can be placed in available S-Data space, in keeping with the scope of the present invention.

Some embodiments of the present invention comprise the following actions: (i) receiving a write command for writing data onto a tape mounted on a tape drive; (ii) in response to the write command being received, dividing the data into data blocks and writing the data blocks in units of dataset onto the tape; (iii) when unmounting the tape from the tape drive, appending a first file mark and an index to the written data; (iv) determining whether an empty area is present in a dataset to which the index has been appended; (v) when it is determined that the empty area is present, writing additional information (for example information pertaining to the data) into the empty area; and (vi) after writing the additional information into the empty area, writing a second file mark in a dataset following the dataset to which the index has been appended. The additional information pertaining to the data is written into the empty area in response to a command being received, the command being different from the write command. In some embodiments, the additional information is a log of operation(s) performed against a file corresponding to the data. The index represents a directory structure for files corresponding to all data written before the tape is unmounted.

In some embodiments, indexes are written more frequently, to avoid loss of any data, by periodically writing an index in a data partition. For example, a user can configure a tape storage system to perform the following behaviors in addition to writing an index upon unmounting the tape from the tape drive: (i) writing an index periodically (such as every five minutes, provided a file is written or updated, or based on any other meaningful criteria such as number of bytes written, number of files written, etc.); (ii) writing an index every time a file is closed; and/or (iii) writing an index only upon unmounting the tape. In some embodiments, the storage system may be configured to write indexes under other conditions not listed here. In some embodiments, a user can manually initiate writing an index by invoking an application programming interface (API).

Some embodiments of the present invention further comprise the following actions: (i) after mounting the unmounted tape on the tape drive again, executing a read command for moving a head of the tape drive to the dataset to which the index has been appended and for reading the additional information; and (ii) in response to the read command having been executed, reading the additional information in the dataset to which the index has been appended.

Some embodiments may not have the potential advantages discussed throughout this disclosure, and the potential advantages are not necessarily required of all embodiments.

IV. Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

User/subscriber: includes, but is not necessarily limited to, the following: (i) a single individual human; (ii) an artificial intelligence entity with sufficient intelligence to act as a user or subscriber; and/or (iii) a group of related users or subscribers.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A method comprising:
   receiving, from a first application, a data block and a corresponding write command for writing the data block onto a data storage medium having information recorded thereon, wherein:
      the information is formatted in accordance with a data storage format standard that includes a first write function and a first read function,
      the information includes a first dataset and a second dataset, and the first dataset includes a first file mark, an index, and an empty space interposed between the second dataset and a combination of the first file mark and the index; and
   in response to receiving the write command:
      determining that the empty space is present in the first dataset,
      writing, by a second write function, the data block into the empty space, and
      writing a second file mark in the second dataset;
   wherein the empty space of the data storage medium is inaccessible to the first write function of the data storage format standard.

2. The method of claim 1, wherein:
   the data storage device is a tape drive unit; and
   the data storage medium is a tape medium.

3. The method of claim 1 wherein the data storage format standard is a linear tape file system (LTFS).

4. The method of claim 1, wherein the first dataset and the second dataset are adjacent to each other.

5. The method of claim 1, further comprising:
   receiving, from a second application, a read command for reading the data block;
   in response to receiving the read command:
      determining that the data block is present in the empty space interposed between the second dataset and the combination of the first file mark and the index,
      reading, by a second read function, the data block; and
      sending the data block to the second application;
   wherein the empty space of the data storage medium is inaccessible to the first read function of the data storage format standard.

6. The method of claim 1, wherein the index represents a directory structure for files corresponding to data written to the data storage medium.

7. A computer program product comprising:
   one or more computer readable storage media and program instructions stored on the one or more computer readable storage media, the program instructions comprising instructions to perform:
      receiving, from a first application, a data block and a corresponding write command for writing the data block onto a data storage medium having information recorded thereon, wherein:
         the information is formatted in accordance with a data storage format standard that includes a first write function and a first read function,
         the information includes a first dataset and a second dataset, and
         the first dataset includes a first file mark, an index, and an empty space interposed between the second dataset and a combination of the first file mark and the index; and
      in response to receiving the write command:
         determining that the empty space is present in the first dataset,
         writing, by a second write function, the data block into the empty space, and
         writing a second file mark in the second dataset;
      wherein the empty space of the data storage medium is inaccessible to the first write function of the data storage format standard.

8. The computer program product of claim 7, wherein:
   the data storage device is a tape drive unit; and
   the data storage medium is a tape medium.

9. The computer program product of claim 7 wherein the data storage format standard is a linear tape file system (LTFS).

10. The computer program product of claim 7, wherein the first dataset and the second dataset are adjacent to each other.

11. The computer program product of claim 7, further comprising:
receiving, from a second application, a read command for reading the data block;
in response to receiving the read command:
determining that the data block is present in the empty space interposed between the second dataset and the combination of the first file mark and the index,
reading, by a second read function, the data block; and
sending the data block to the second application;
wherein the empty space of the data storage medium is inaccessible to the first read function of the data storage format standard.

12. The computer program product of claim 7, wherein the index represents a directory structure for files corresponding to data written to the data storage medium.

13. A computer system comprising:
one or more computer processors;
one or more computer-readable storage media;
program instructions stored on the computer-readable storage media for execution by at least one of the one or more processors, the program instructions comprising instructions to perform:
receiving, from a first application, a data block and a corresponding write command for writing the data block onto a data storage medium having information recorded thereon, wherein:
the information is formatted in accordance with a data storage format standard that includes a first write function and a first read function,
the information includes a first dataset and a second dataset, and
the first dataset includes a first file mark, an index, and an empty space interposed between the second dataset and a combination of the first file mark and the index; and
in response to receiving the write command:
determining that the empty space is present in the first dataset,
writing, by a second write function, the data block into the empty space, and
writing a second file mark in the second dataset;
wherein the empty space of the data storage medium is inaccessible to the first write function of the data storage format standard.

14. The computer system of claim 13, wherein:
the data storage device is a tape drive unit; and
the data storage medium is a tape medium.

15. The computer system of claim 13 wherein the data storage format standard is a linear tape file system (LTFS).

16. The computer system of claim 13, wherein the first dataset and the second dataset are adjacent to each other.

17. The computer system of claim 13, further comprising:
receiving, from a second application, a read command for reading the data block;
in response to receiving the read command:
determining that the data block is present in the empty space interposed between the second dataset and the combination of the first file mark and the index,
reading, by a second read function, the data block; and
sending the data block to the second application;
wherein the empty space of the data storage medium is inaccessible to the first read function of the data storage format standard.

18. The computer system of claim 13, wherein the index represents a directory structure for files corresponding to data written to the data storage medium.

* * * * *